United States Patent
Bishop

(10) Patent No.: US 12,071,221 B2
(45) Date of Patent: Aug. 27, 2024

(54) SPOILER ACTUATION APPARATUS FOR MOVING AN AIRCRAFT SPOILER

(71) Applicant: Airbus Operations Limited, Bristol (GB)

(72) Inventor: Benjamin Bishop, Bristol (GB)

(73) Assignee: Airbus Operations Limited, Bristol (GB)

(*) Notice: Subject to any disclaimer, the term of this patent is extended or adjusted under 35 U.S.C. 154(b) by 52 days.

(21) Appl. No.: 17/838,377

(22) Filed: Jun. 13, 2022

(65) Prior Publication Data

US 2022/0315204 A1   Oct. 6, 2022

Related U.S. Application Data

(63) Continuation of application No. PCT/EP2020/086206, filed on Dec. 15, 2020.

(30) Foreign Application Priority Data

Dec. 20, 2019 (GB) ...................................... 1918962

(51) Int. Cl.
    *B64C 13/30*   (2006.01)
    *B64C 9/22*   (2006.01)

(52) U.S. Cl.
    CPC ............... *B64C 13/30* (2013.01); *B64C 9/22* (2013.01)

(58) Field of Classification Search
    CPC ......... B64C 13/00; B64C 13/24; B64C 13/26; B64C 13/28; B64C 13/30
    See application file for complete search history.

(56) References Cited

U.S. PATENT DOCUMENTS 1,858,259 A * 5/1932 Alfaro ..................... B64C 9/22
                                                244/214
2,164,531 A * 7/1939 Lee ......................... B64C 9/32
                                                244/113

(Continued)

FOREIGN PATENT DOCUMENTS

CN    109515689 A  *  3/2019
DE    733 504 C       3/1943

(Continued)

OTHER PUBLICATIONS

International Search Report and Written Opinion for Application No. PCT/EP2020/086206 dated Feb. 8, 2021.

*Primary Examiner* — Philip J Bonzell
*Assistant Examiner* — Anna L. Gordon
(74) *Attorney, Agent, or Firm* — KDW Firm PLLC

(57) ABSTRACT

A spoiler actuation apparatus for moving an aircraft spoiler. The spoiler is moveable between a stowed configuration and a deployed configuration. The spoiler actuation apparatus includes a guide member, a rack mounted on the guide member and slideable along a longitudinal axis of the guide member, and a gear coupled to the rack, the gear arranged to move the spoiler in response to sliding of the rack. The rack is held at a first position when the spoiler is in the stowed configuration. An actuator moves the rack from the first position to a second position along the longitudinal axis. When the rack is at the second position, the rack is operable to accelerate relative to the guide member away from the second position by an aerodynamic force acting on the spoiler.

18 Claims, 6 Drawing Sheets

(56) References Cited

U.S. PATENT DOCUMENTS

| | | | |
|---|---|---|---|
| 2009/0146000 A1 | 6/2009 | Bushnell | |
| 2015/0052875 A1* | 2/2015 | Lohman | F02K 1/72 |
| | | | 60/228 |
| 2016/0129991 A1* | 5/2016 | Schwartz | B64C 13/30 |
| | | | 244/99.3 |
| 2019/0315454 A1* | 10/2019 | Fox | F16D 51/20 |
| 2021/0114714 A1* | 4/2021 | Tsai | B64C 9/06 |

FOREIGN PATENT DOCUMENTS

| | | | | |
|---|---|---|---|---|
| WO | WO-0249904 A1 * | 6/2002 | | B62D 3/123 |
| WO | WO 2009/136187 A1 | 11/2009 | | |

* cited by examiner

SPOILER ACTUATION APPARATUS FOR MOVING AN AIRCRAFT SPOILER

CROSS-REFERENCE TO RELATED APPLICATIONS

This application is a continuation of and claims priority to PCT/EP2020/086206 filed Dec. 15, 2020, which claims priority to GB Patent Application No. 1918962.0 filed Dec. 20, 2019, the entire disclosures of which are incorporated by reference herein.

TECHNICAL FIELD

The present disclosure relates to aircraft with moveable spoilers.

BACKGROUND

Aircraft may be equipped with moveable spoilers attached to wing structures. The spoilers may be used to provide load-alleviation during flight, for example, in the event of wind gusts. Typically, the spoiler can move from a stowed configuration to a deployed, or load-alleviating, configuration in which the load on the wing is reduced. Once the cause of the requirement to enter the load-alleviating configuration has passed, it is often desirable to move the spoiler back into the stowed configuration.

Some aircraft may be able to detect approaching gusts, and to deploy a spoiler accordingly. However, the speed of deployment of the spoiler is a consideration on many aircraft. For example, many commercial airliners cruise at around Mach 0.8. Consequently, the aircraft may encounter a gust a very short time (e.g. a fraction of a second) after detecting it. To provide load-alleviation from such gusts, it is therefore desirable to deploy the spoiler as quickly as possible.

An actuator, for example an electro-mechanical actuator, may be used to move the spoiler between different configurations, for example between a stowed configuration and a deployed configuration. The actuator may move the spoiler in response to the detection of an oncoming gust. However, such an actuator may require a substantial load and/or power capacity, particularly in order to deploy the spoiler quickly enough to provide adequate load-alleviation. Typically, the larger the load and/or power capacity required by the actuator, the larger and heavier the actuator. The inclusion of a large, heavy (and potentially complex) actuator system on the aircraft may lessen or erode some or all of the aerodynamic benefits brought about by the moveable spoiler itself. Further, on-board space is an important consideration on aircraft.

The disclosure herein seeks to mitigate one or more of the above-mentioned problems. Alternatively or additionally, the disclosure herein seeks to provide an improved aircraft and aircraft wing.

SUMMARY

According to a first aspect, an aircraft wing comprises a wing structure and a spoiler moveable relative to the wing structure between a stowed configuration and a deployed configuration. The aircraft wing comprises a spoiler actuation apparatus. The spoiler actuation apparatus comprises a guide member. The spoiler actuation apparatus also comprises a rack mounted on the guide member and slideable along a longitudinal axis of the guide member. The rack is arranged to be held at a first position along the longitudinal axis when the spoiler is in the stowed configuration. The spoiler actuation apparatus comprises a gear coupled to the rack. The gear is arranged to move the spoiler relative to the wing structure in response to sliding of the rack. The spoiler actuation apparatus also comprises an actuator. The actuator is operable to move the rack from the first position to a second position along the longitudinal axis. When the rack is at the second position, the rack is operable to accelerate relative to the guide member away from the second position by an aerodynamic force acting on the spoiler, such that the spoiler moves from the stowed configuration to the deployed configuration.

The wing structure may comprise a folding wing tip. In other cases, the wing structure comprises a fixed-wing structure. In the stowed configuration, the upper surface of the spoiler may be a continuation of the upper surface of the wing structure. There may be a smooth transition from the wing structure to the spoiler. In the deployed configuration, the spoiler is moved relative to the wing structure, and the load on the wing is reduced. In some cases, the upper surface of the spoiler is moved away from the upper surface of the wing structure in the deployed configuration. The spoiler may be movable, from the stowed configuration to the deployed configuration, in an upwards direction. The spoiler may be movable, from the deployed configuration to the stowed configuration, in a downwards direction.

During flight, a negative pressure exists on the upper surface of the wing. This negative pressure causes an upward lifting force which urges the spoiler towards the deployed configuration. This upward lifting force may be substantial. For example, the upward lifting force may be of the order of 900 Newtons applied over the area of the spoiler. The spoiler actuation apparatus of the first aspect exploits this aerodynamic force, namely by allowing the rack to slide relative to the guide member under the action of the aerodynamic force. This effectively decouples the movement of the rack (and therefore the spoiler) from the speed and/or inertia of the actuator. The rate of acceleration of the rack relative to the guide member may be dependent on the magnitude of the aerodynamic lifting force. The spoiler actuation apparatus of the first aspect therefore allows the spoiler to deploy more quickly during flight compared to known mechanisms. The spoiler actuation apparatus may allow the spoiler to be deployable in less than a second. In some cases, the spoiler can deploy in less than 0.2 seconds. The spoiler is deployable in approximately 0.1 seconds in some examples. The spoiler may therefore be considered to be a "pop-up" spoiler.

By reducing the spoiler deployment time, the spoiler can react to temporal aerodynamic events, such as gusts, more effectively. For example, an oncoming gust may be detected (e.g. using light detection and ranging (LIDAR), or other gust detection techniques), and in response the spoiler may be deployed quickly, to reduce and alleviate gust loads. Alleviating gust loads can reduce structural deformations of the wing (e.g. due to wing bending moments). This can allow for a lighter airframe to be used. Additionally or alternatively, this may enable the wing to have a relatively large span, without necessarily having to incur the associated weight penalty, because it can be designed for a lower magnitude of maximum load. Further, alleviating gust loads can improve dynamic flight performance and/or comfort for passengers.

Moreover, by using aerodynamic forces to aid deployment of the spoiler, the size and/or weight of the actuator may be reduced. In some embodiments, the actuator is used to move the rack from the first position to the second position, but is not used to move the rack away from the second position to deploy the spoiler. As such, an actuator having a lower power output may be used, compared to a case in which the actuator is required to move the rack until the spoiler is fully deployed. In such a comparative case, where it is desired for the spoiler to be deployed as quickly as possible (e.g. in less than a second), a particularly large and/or powerful actuator may be required. By using the aerodynamic lifting force to aid spoiler deployment, the need for such a large and/or powerful actuator is reduced, thereby reducing the associated weight and/or space penalty.

Deployment of the spoiler using the spoiler actuation apparatus may be considered to comprise two phases. In the first phase, the rack is moved by the actuator from the first position to the second position. When the rack is in the first position, the aerodynamic force is unable to cause the spoiler to deploy, and therefore the spoiler is kept securely in the stowed configuration. When the rack is moved to the second position, however, the aerodynamic force is able to cause the rack to accelerate away from the second position, thereby deploying the spoiler. The movement of the rack away from the second position (e.g. to a third position) corresponds to the second movement phase. The second phase may involve the rack moving relatively quickly compared to the first phase. As such, a first, actuator-driven phase is followed by and causes a second, aerodynamic-driven phase. In the second phase, movement of the rack is decoupled from the speed and/or inertia of the actuator. This allows the deployment of the spoiler to be both controlled, since it is initiated by the actuator, and fast, since movement in the second phase is decoupled from actuator speed and/or inertia.

When the spoiler is in the deployed configuration, the spoiler is preferably moved to a position in which the load on the wing is alleviated. It will be appreciated that the deployed configuration may encompass the spoiler being in a range of positions, all of which alleviate load to some degree. The position (for example the distance of the upper surface of the spoiler from the upper surface of the wing structure) may be dependent on the magnitude of load that is sought to be alleviated. The spoiler may be repeatably moveable between the deployed configuration and the stowed configuration.

The rack may be mounted on the guide member using a linear ball bearing. Such a ball bearing may reduce the coefficient of friction between the rack and the guide member. As such, in some embodiments, the rack can slide with respect to the guide member relatively freely (i.e. with a relatively low coefficient of friction). This allows the rack to accelerate relative to the guide member, under the action of aerodynamic forces acting on the spoiler, with a reduced damping force due to friction, thereby enabling the spoiler deployment time (i.e. the time for the spoiler to move from the stowed configuration to the deployed configuration) to be reduced.

In some embodiments, when the rack is at the second position, the rack is operable to accelerate away from the second position in the absence of the actuator acting on the rack. That is, the actuator may be used to move the rack from the first position to the second position, but not (in some embodiments) be involved in moving the rack away from the second position to deploy the spoiler. For example, the actuator may be arranged such that it is not in contact with the rack as the rack is accelerating away from the second position. The rack may accelerate away from the second position purely under the action of the aerodynamic force. As such, the acceleration of the rack away from the second position may be unhindered by inertia or resistance associated with the actuator. This allows the spoiler deployment time to be reduced.

The actuator may comprise the guide member. In such embodiments, the guide member is linearly moveable along the longitudinal axis. As such, the guide member may act as both a guide along which the rack can slide, and an actuator to cause the rack, and consequently the spoiler, to move. The guide member may comprise a rod. The rack may comprise a cylindrical member surrounding the rod, and substantially coaxial with the rod. In some embodiments, the guide member comprises a push-pull rod (i.e. a rod that is linearly moveable in both directions along its axis). The actuator may comprise an electro-mechanical drive configured to push and/or pull the guide member. The guide member may be moved in response to receipt of a spoiler actuation signal, for example from a gust detector. Movement of the guide member along its axis can cause movement of the rack along the same axis.

The actuator may comprise a stop rigidly coupled to the guide member. The stop is operable to push the rack from the first position to the second position. As such, moving the guide member in a given direction along its axis causes the stop to push the rack in that direction. This allows the speed and extent of the rack movement to be controlled by the movement of the guide member.

When the spoiler is in the deployed configuration, the rack is at a third position along the longitudinal axis. The second position is between the first position and the third position. The actuator may be operable to move the rack from the third position towards the first position, to cause the spoiler to move from the deployed configuration to the stowed configuration. In other words, the spoiler actuation apparatus may be operable to move the spoiler from the stowed configuration to the deployed configuration and vice-versa. The rack can be moved in a first direction from the first position to the second position to cause the spoiler to be deployed, and can be moved in a second, opposite direction from the third position towards the first position to cause the spoiler to be stowed.

In some embodiments, the actuator comprises a stop rigidly coupled to the guide member. The stop is arranged to push the rack from the third position towards the first position. Therefore, in some cases, a first stop rigidly coupled to the guide member is operable to push the rack in a first direction, from the first position to the second position, and a second stop rigidly coupled to the guide member is operable to push the rack in a second direction, from the third position towards the first position. In some cases, the actuator is arranged to push the rack from the third position to the first position (e.g. by applying a continuous force on the rack). This is in contrast with the deployment mechanism, in which the actuator pushes the rack from the first position to the second position but is not required to push the rack from the second position to the third position. This is due to the aerodynamic force acting on the spoiler biasing the spoiler towards the deployed configuration, and thus biasing the rack towards the third position. The aerodynamic forces are exploited to deploy the spoiler, whereas the actuator must work against and overcome these aerodynamic forces to retract the spoiler when moving the rack from the third position towards the first position. As such, deployment of the spoiler may be faster than retraction of the spoiler.

The spoiler actuation apparatus may comprise a linkage arm. The linkage arm is coupled to the gear and to the spoiler. Rotation of the gear causes the linkage arm to rotate about the rotational axis of the gear, thereby to move the spoiler. In other words, sliding of the rack causes rotation of the gear, which in turn causes the linkage arm to rotate and to move the spoiler.

The linkage arm may be arranged to move about the rotational axis of the gear between a bottom center position and a top center position. The bottom center position corresponds to a position directly beneath the rotational axis of the gear, and the top center position corresponds to a position directly above the rotational axis of the gear. The linkage arm is arranged to be at the top center position when the spoiler is in the deployed configuration (e.g. when the rack is at the third position along the longitudinal axis). The linkage arm may be at the bottom center position when the rack is at the first position. Preferably, however, the linkage arm is displaced relative to the bottom center position when the rack is at the first position. For example, the linkage arm may be displaced by approximately 2° from the bottom center position. This allows the spoiler to be held securely in the stowed configuration until the actuator moves the rack from the first position to the second position, thereby providing greater control over the deployment mechanism. This is described in more detail below.

When the rack is at the first position, the aerodynamic force is operable to urge the linkage arm to rotate in a first direction (e.g. clockwise). When the rack is at the second position, the aerodynamic force is operable to urge the linkage arm to rotate in a second, different direction (e.g. anti-clockwise). This is due to the linkage arm being displaced to one side of the bottom center position when the rack is at the first position, and to the other side of the bottom center position when the rack is at the second position. For example, the linkage arm may be to the left of bottom dead center when the rack is at the first position. This means that the aerodynamic force urges the linkage arm to rotate in a clockwise direction in order to try to raise the spoiler. When the rack is at the second position, in contrast, the linkage arm may be to the right of bottom dead center, in which case the aerodynamic force urges the linkage arm to rotate in an anti-clockwise direction. The aerodynamic force acts to urge the linkage arm towards the top dead center position, such that the spoiler is deployed.

The spoiler actuation apparatus may comprise a restraining assembly operable to prevent rotation of the linkage arm in the first direction when the rack is at the first position. The restraining assembly may be operable to apply a restraining force to the linkage arm. The restraining force acts against the aerodynamic force, thereby to prevent the spoiler from deploying when the rack is in the first position. As such, the restraining assembly prevents the spoiler from deploying when the rack is at the first position. The restraining assembly prevents the spoiler from deploying in the absence of the actuator acting on the rack (i.e. moving the rack from the first position to the second position). The restraining assembly may comprise a stop to prevent movement of the linkage arm in a given direction. The stop may be positioned in the vicinity of the bottom center position. Preferably, the stop is laterally offset (i.e. displaced) relative to the bottom center position. For example, the stop may be to the left of the bottom center position, thereby preventing the linkage arm from rotating clockwise from its left-of-center position when the rack is at the first position. The linkage arm may be held against the stop by a spring. The spring may be in an above-center position.

In some embodiments, the spoiler actuation apparatus comprises a further restraining assembly operable to prevent rotation of the linkage arm in the second direction when the spoiler is in the deployed configuration. The further restraining assembly may be operable to prevent the linkage arm from moving past the top center position. The further restraining assembly may comprise a stop, for example. In some cases, the further restraining assembly comprises a spring. In alternative embodiments, such a further restraining assembly is not used. For example, the linkage arm may be held stably in the top center position by aerodynamic forces pulling the spoiler upwards.

In some cases, a plurality of racks and respective gears are used to deploy and/or retract the spoiler, for example a series of coaxially-arranged racks. The racks may each be mounted on the guide member or may each be mounted on different guide members. Using a plurality of racks and gears enables the power and/or torque required to actuate the spoiler to be distributed along the length of the spoiler. The racks may be movable using respective actuators, or a common actuator.

According to a second aspect, there is provided a spoiler actuation apparatus comprising a guide member, and a rack mounted on the guide member and slideable along a longitudinal axis of the guide member. The rack is arranged to be held at a first position along the longitudinal axis when a spoiler is in a stowed configuration. The spoiler actuation apparatus comprises a gear coupled to the rack, the gear being operable to move the spoiler relative to a wing structure in response to sliding of the rack. The spoiler actuation apparatus comprises an actuator operable to move the rack from the first position to a second position along the longitudinal axis. When the rack is at the second position, the rack is operable to accelerate relative to the guide member away from the second position by an aerodynamic force acting on the spoiler, such that the spoiler moves from the stowed configuration to a deployed configuration.

According to a third aspect, there is provided an aircraft comprising an aircraft wing according to the first aspect and/or a spoiler actuation apparatus according to the second aspect. The aircraft may comprise a passenger aircraft, e.g. an airliner. Each wing may comprise multiple spoilers and/or spoiler actuation apparatuses in some cases. The aircraft may operate using a fly-by-wire (FBW) system. In some examples, the aircraft comprises a gust detector for detecting oncoming gusts. Such a gust detector may be based on LIDAR, for example. The gust detector may generate a signal in response to detecting an oncoming gust. The generated signal may cause the spoiler actuation apparatus to actuate the spoiler. In other examples, approaching gusts are not detected by a gust detector. In such cases, the spoiler actuation apparatus may deploy the spoiler in response to other signals (e.g. a signal generated based on input from a pilot, or a signal generated based on a determination that the aircraft is currently encountering a gust).

According to a fourth aspect, there is provided a method of actuating a spoiler for an aircraft wing. The wing comprises a wing structure and a spoiler moveable relative to the wing structure between a stowed configuration and a deployed configuration. The method comprises holding a rack at a first position along a longitudinal axis of a guide member when the spoiler is in the stowed configuration. The rack is mounted on the guide member and slideable along the longitudinal axis. A gear coupled to the rack is arranged to move the spoiler relative to the wing structure in response to sliding of the rack. The method comprises moving the rack from the first position to a second position along the longitudinal axis. When the rack is at the second position, the rack is operable to accelerate relative to the guide member away from the second position by an aerodynamic force acting on the spoiler, such that the spoiler moves from the stowed configuration to a deployed configuration.

According to a fifth aspect, there is provided an aircraft wing comprising a wing structure and a spoiler moveable relative to the wing structure between a stowed configuration and a deployed configuration. The aircraft wing comprises a spoiler actuation apparatus. The spoiler actuation apparatus comprises a push-pull rod operable to be moved along the longitudinal axis of the push-pull rod. The spoiler actuation apparatus comprises a rack slideably mounted on the push-pull rod and slideable along the longitudinal axis. The spoiler actuation apparatus comprises a gear coupled to the rack, the gear being arranged to move the spoiler relative to the wing structure in response to sliding of the rack. In response to moving of the push-pull rod along the longitudinal axis, the rack is operable to slide relative to the push-pull rod under the action of an aerodynamic force to deploy the spoiler.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1A:
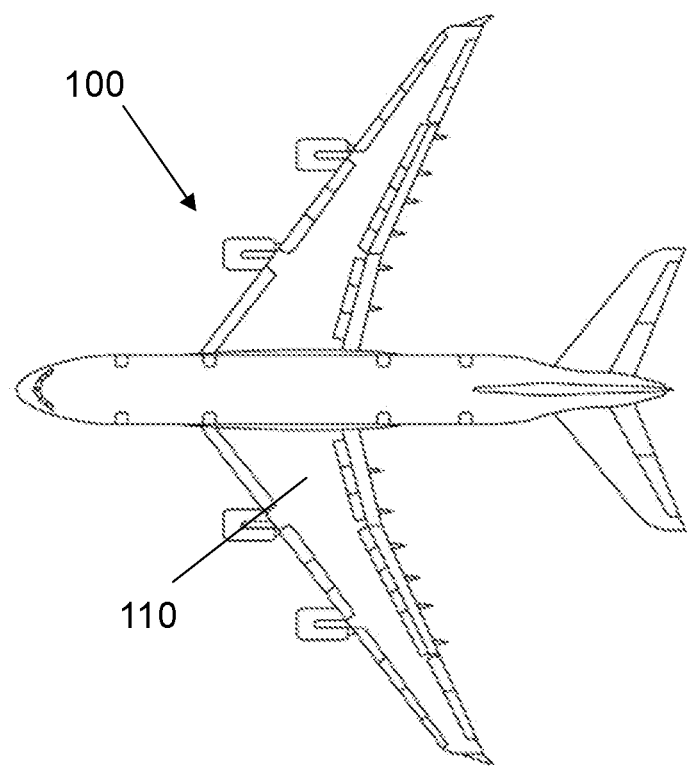
FIG. 1A shows a schematic plan view of an aircraft according to a first embodiment.
Figure 1B:
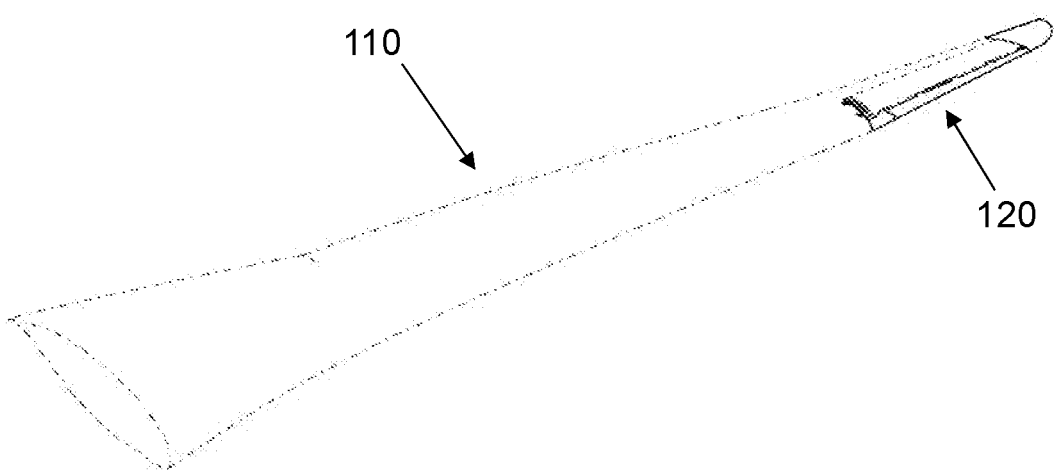
FIGS. 1B and 1C show schematic views of parts of a wing of the aircraft of FIG. 1A.

FIG. 1A shows a plan view of an aircraft 100 according to a first embodiment. The aircraft 100 is a fixed-wing aircraft. The aircraft 100 comprises a wing 110. While the wing 110 shown in FIG. 1A is a swept wing, the methods and apparatuses described herein may also be applied to unswept wings. The wing 110 is shown in isolation in FIG. 1B. The wing 110 comprises a wing tip region 120.

Figure 1C:
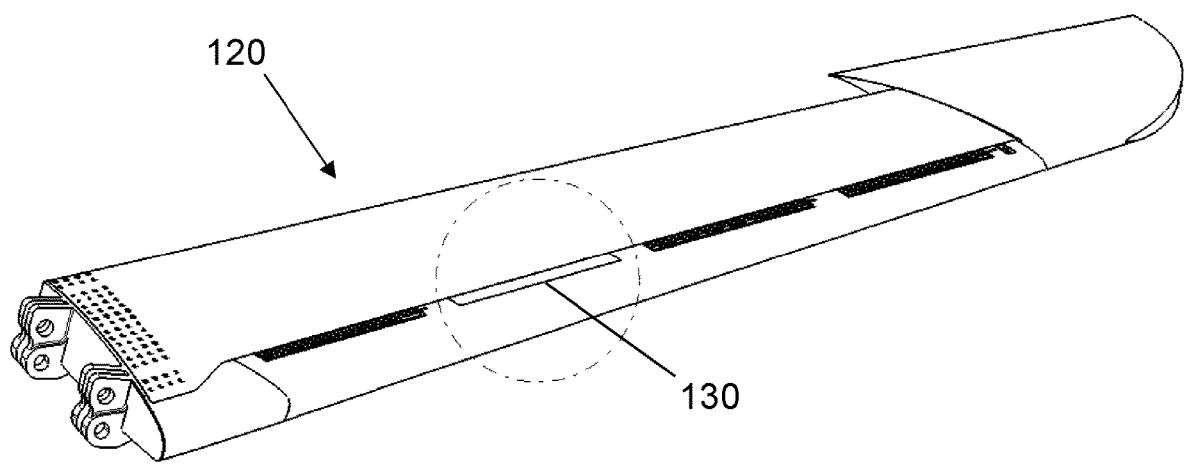

FIG. 1C shows the wing tip region 120 of the wing 110 in more detail. The wing tip region 120 comprises a moveable spoiler 130. While the spoiler 130 is located in the wing tip region 120 in the embodiment shown in FIG. 1C, one or more spoilers may additionally or alternatively be located in other regions of the wing 110 in alternative embodiments. Similarly, while the spoiler 130 is located in the vicinity of the wing leading edge in this embodiment, one or more spoilers may be located elsewhere (e.g. at the trailing edge) in alternative embodiments.

Figure 1D:
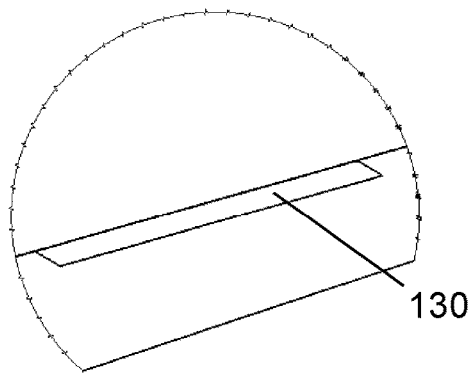
FIGS. 1D and 1E show schematic views of a spoiler in a stowed and a deployed configuration, respectively, according to the first embodiment.

FIG. 1D shows a close-up view of the spoiler 130 in a stowed configuration. In the stowed configuration, the upper surface of the spoiler 130 is substantially continuous with the wing upper surface.

Figure 1E:
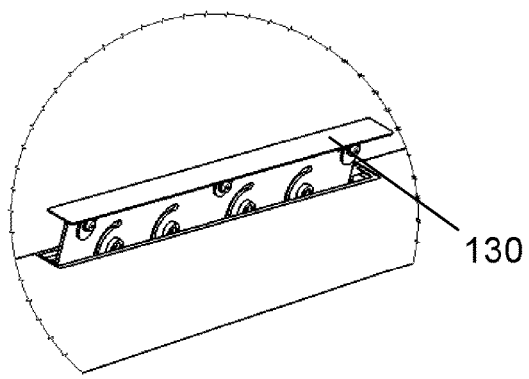

FIG. 1E shows a close-up view of the spoiler 130 in a deployed configuration. In the deployed configuration, the upper surface of the spoiler 130 is moved upwards (i.e. raised) relative to the wing upper surface. As such, the upper surface of the spoiler 130 is no longer continuous with the wing upper surface. The spoiler 130 is deployed and/or stowed using a spoiler actuation apparatus as will be described in more detail below.

Figure 2A:
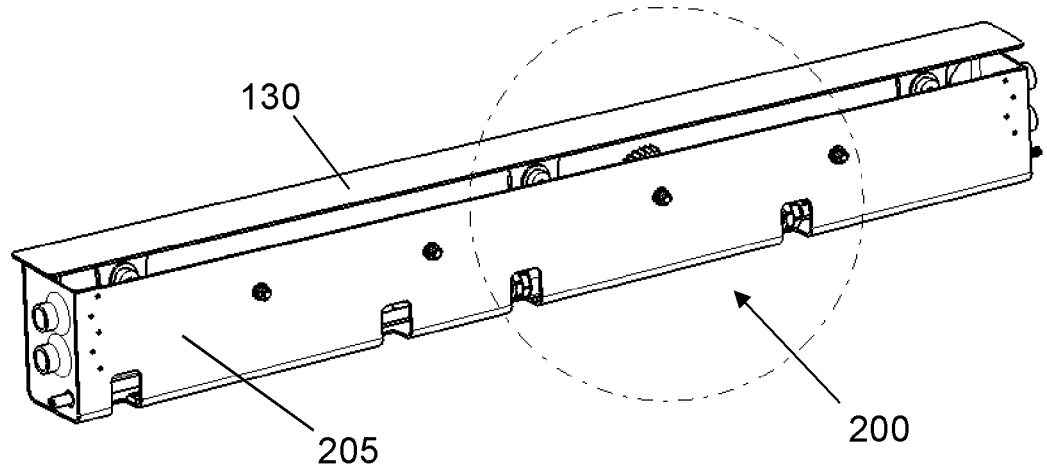
FIGS. 2A and 2B show schematic views of a spoiler actuation apparatus according to the first embodiment.
Figure 2B:
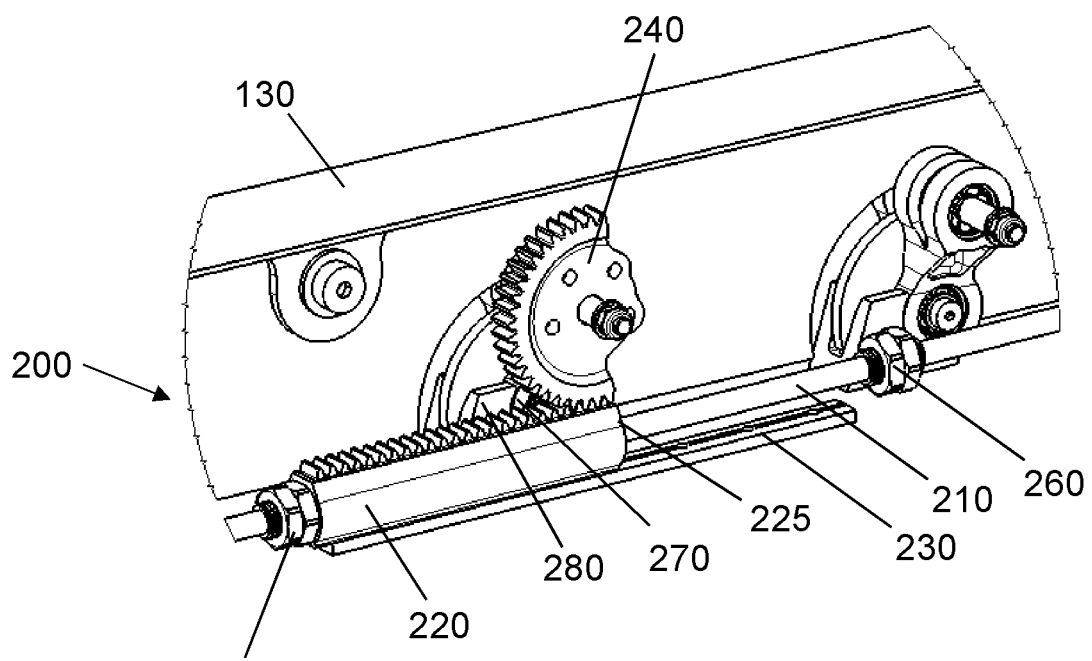

FIGS. 2A and 2B show the spoiler 130 and spoiler actuation apparatus 200 in more detail. In FIG. 2A, a front housing 205 of the spoiler actuation apparatus 200 is included. In FIG. 2B, the front housing 205 is omitted in order to depict the internal components.

The spoiler actuation apparatus 200 comprises a push-pull rod 210. The longitudinal axis of the push-pull rod 210 is substantially parallel with the longitudinal axis of the spoiler 130. In this embodiment, the push-pull rod 210 is moveable in a linear manner along its longitudinal axis in both directions.

A rack 220 is mounted on a guide member, which in this embodiment takes the form of the push-pull rod 210. The rack 220 is configured to slide relative to the push-pull rod 210. The rack 220 is mounted on the push-pull rod 210 via a linear ball bearing 225. In this embodiment, the spoiler actuation apparatus 200 comprises a secondary guide 230. The secondary guide 230 is arranged to guide the movement of the rack 220 relative to the push-pull rod 210, and/or to maintain the orientation of the rack 220. In alternative embodiments, the secondary guide 230 is not used.

A gear 240 meshes with the rack 220. In this embodiment, teeth on the upper surface of the rack mesh with corresponding teeth on the gear. As such, sliding of the rack 220 along the longitudinal axis of the push-pull rod 210 causes rotation of the gear 240. A linkage arm 270 links the gear 240 with the spoiler 130. Accordingly, rotation of the gear 240 caused by sliding of the rack 220 causes the linkage arm 270 to move, thereby to move the spoiler 130. A restraining assembly 280 prevents movement of the linkage arm 270 in the clockwise direction. The restraining assembly 280 comprises a stop.

The spoiler actuation apparatus 200 also comprises an inboard stop 250 and an outboard stop 260. The stops 250, 260 are rigidly coupled to the push-pull rod 210, such that the stops 250, 260 move linearly with the push-pull rod 210. The inboard stop 250 is "inboard" in the sense that it is closest to the root of the wing 110, and the outboard stop 260 is "outboard" in the sense that it is closest to the tip of the wing 110. The stops 250, 260 are used to push against the rack 220, thereby to cause the rack 220 to move.

The push-pull rod 210 and the stops 250, 260 may be considered to form an actuator, since they are used to cause the rack 220 to move. Such an actuator may also comprise a drive mechanism (not shown) for linearly moving the push-pull rod 210. The drive may be electro-mechanical. In other cases, the drive can be hydraulic or pneumatic. The drive may comprise a linear actuator or rotary actuator, for example.

FIGS. 3A through 3E show the spoiler 130 and spoiler actuation apparatus 200 at sequential times during spoiler deployment (i.e. moving from the stowed configuration to the deployed configuration).

Figure 3A:
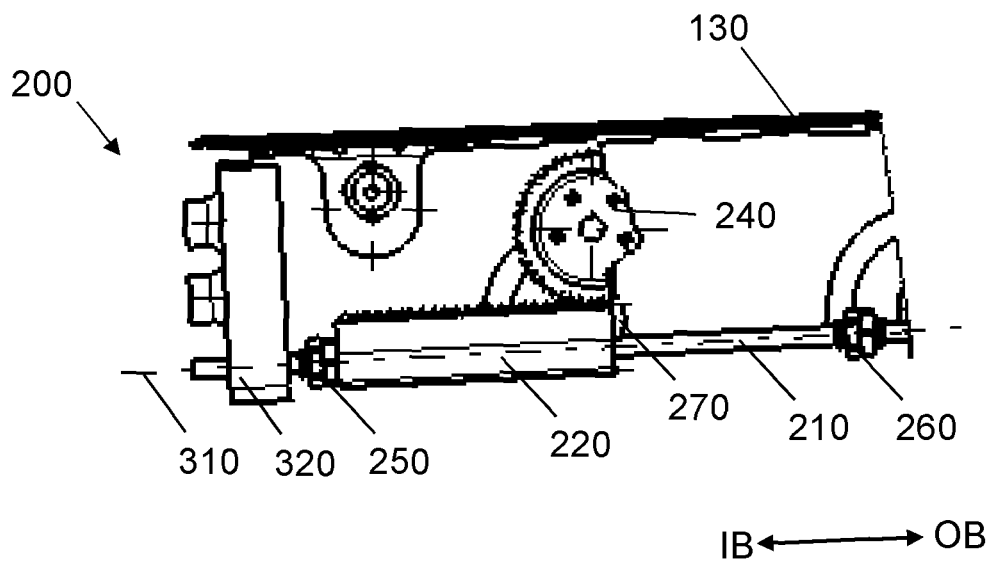
FIGS. 3A through 3E show the spoiler actuation apparatus of the first embodiment in different stages of deployment.

Referring first to FIG. 3A, the spoiler 130 is held securely in the stowed configuration. The rack 220 is held at a first position along the longitudinal axis 310. With the rack 220 at the first position, the linkage arm 270 is held in a position that is displaced from bottom dead center. It should be noted that the linkage arm 270 is partially obscured by the rack 220 in FIGS. 3A and 3B and is more clearly visible in FIGS. 3C-3E. The linkage arm 270 is held against a stop by an over center spring (not shown). Further, the rack 220 is prevented from moving inboard by the inboard stop 250. Therefore, the aerodynamic forces acting on the spoiler 130 are prevented from causing the spoiler 130 to deploy.

Figure 3B:
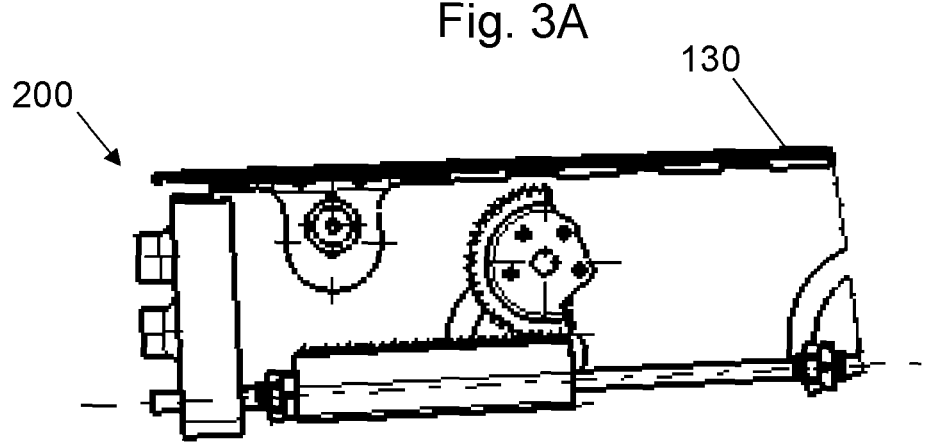

Turning to FIG. 3B, the push-pull rod 210 moves along its longitudinal axis 310 in an outboard direction (i.e. to the right in FIGS. 3A-3E). The inboard stop 250 pushes against the inboard surface of the rack 220. This causes the rack 220 to move from the first position to the second position. The movement of the rack 220 causes the gear 240 to rotate, which in turn causes the linkage arm 270 to move in an anti-clockwise direction, past the bottom dead center position. It should be noted that the distance between the first position and the second position is small in this example, but it may be different in other examples.

Figure 3C:
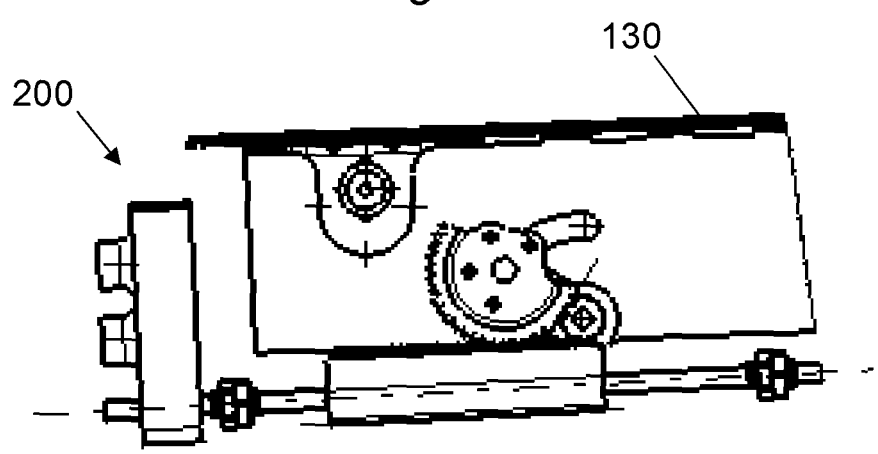

In FIG. 3C, the rack 220 accelerates away from the second position, in the outboard direction. The rack 220 slides relative to the push-pull rod 210. Therefore, the rack 220 moves away from the inboard stop 250. As such, while the rack 220 moves with the push-pull rod 210 between the first position (FIG. 3A) and the second position (FIG. 3B), only the rack 220 moves beyond the second position (FIG. 3C) in this embodiment. The rate of acceleration is determined by the upward lifting force acting on the spoiler 130, due to negative pressure on the upper surface of the spoiler 130. The mechanism may be considered to be in a free state, since the rack 220 is free to move in a substantially frictionless manner purely under the action of aerodynamic forces. Further, the movement of the rack 220 away from the second position is decoupled from the speed and/or inertia of the actuator. As the rack 220 moves in the outboard direction, the linkage arm 270 is forced to move in an anti-clockwise direction, thereby pushing the spoiler 130 upwards.

Figure 3D:
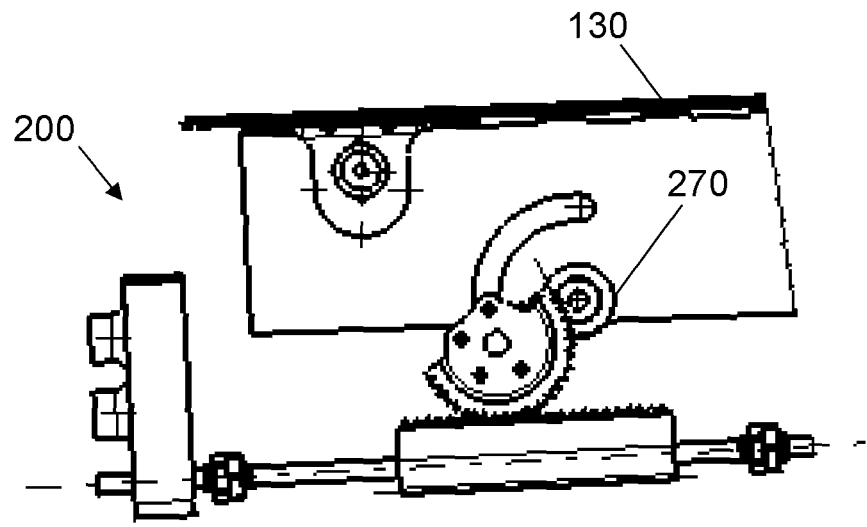

In FIG. 3D, the rack 220 continues to move relative to the push-pull rod 210 in the outboard direction. The spoiler 130 thus continues to deploy, as the linkage arm 270 rotates anti-clockwise about the rotational axis of the gear 240. In some cases, the rack 220 continues to accelerate. In other examples, the rack 220 reaches a constant velocity as it slides relative to the push-pull rod 210.

Figure 3E:
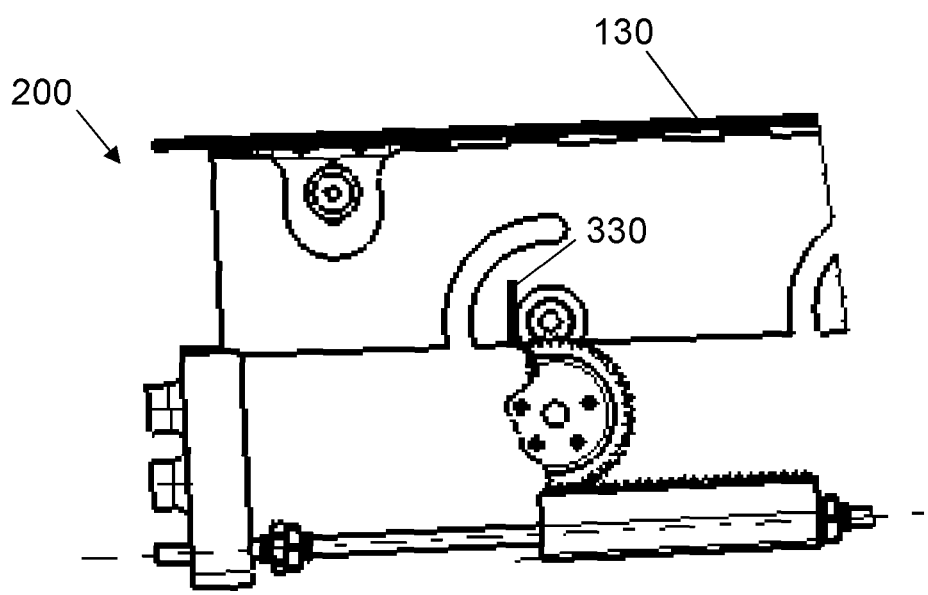

Turning to FIG. 3E, the spoiler 130 is in a fully deployed state. The rack 220 is at the third position along the longitudinal axis 310. The linkage arm 270 is at the top center position. This can be considered a stable configuration, since the aerodynamic forces continue to urge the spoiler 130 upwards. In this embodiment, the linkage arm 270 is held against a restraining assembly 330 (e.g. comprising a stop) to facilitate the stability of the deployed spoiler 130. In other examples, no such restraining assembly is used.

To retract the spoiler 130 from the configuration shown in FIG. 3E, the push-pull rod 210 moves in an inboard direction (i.e. to the left in FIGS. 3A-3E). The outboard stop 260 pushes against the outboard face of the rack 220, causing the rack 220 to move in the inboard direction, back towards the first position. The rack 220 meshes with the gear 240 and causes the linkage arm 270 to rotate in a clockwise direction. The linkage arm 270 rotates until it has moved past bottom dead center and is held against a stop (as shown in FIG. 3A). It should be noted that the push-pull rod 210 is not obstructed by the inboard casing 320 as it moves in the inboard direction. A hole (not shown) in the inboard casing 320 allows the push-pull rod 210 to move therethrough. The push-pull rod 210 may then be moved outboard until the inboard stop 250 is close to contacting the inboard face of the rack 220. The spoiler 130 is then ready to be deployed again. In alternative embodiments, the direction of movement of the push-pull rod 210 and/or the rack 220 is reversed. That is, movement of the push-pull rod 210 in an inboard direction may cause the spoiler to deploy, and moment of the push-pull rod 210 in an outboard direction may cause the spoiler to retract.

Figure 4:
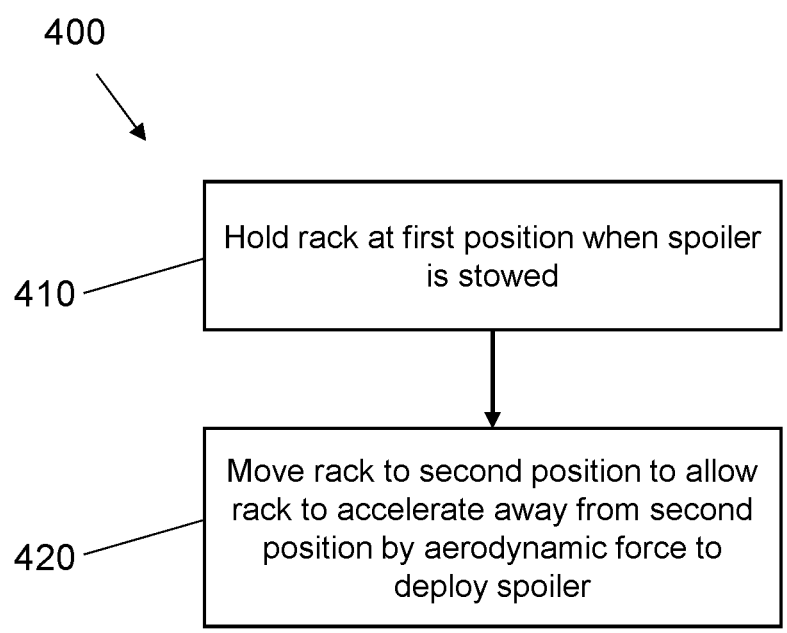
FIG. 4 shows a flow chart depicting a method according to a second embodiment.

FIG. 4 shows a method 400 according to a second embodiment. The method 400 is a method of actuating a spoiler for an aircraft wing, the wing comprising a wing structure and a spoiler moveable relative to the wing structure between a stowed configuration and a deployed configuration. The method 400 may be used to actuate a spoiler such as the spoiler 130 described above.

At item 410, a rack is held at a first position along a longitudinal axis of a guide member when the spoiler is in the stowed configuration. The rack is mounted on the guide member and is slideable along the longitudinal axis. A gear coupled to the rack is arranged to move the spoiler relative to the wing structure in response to sliding of the rack.

At item 420, the rack is moved from the first position to a second position along the longitudinal axis. When the rack is at the second position, the rack is operable to accelerate relative to the guide member away from the second position by an aerodynamic force acting on the spoiler, such that the spoiler moves from the stowed configuration to the deployed configuration.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

In examples described above, the guide member comprises a cylindrical rod. In other examples, the guide member has other shapes (e.g. a planar or cuboidal shape).

In some examples, the guide member is static. That is, the actuator may not comprise the guide member. Additionally or alternatively, the actuator optionally does not comprise a stop rigidly coupled to the guide member. In such examples, the guide member (and/or a stop rigidly fixed thereon) does not cause the rack to move from the first position to the second position. Instead, the rack may be moved to the second position via an independent actuator and may move relative to the static guide member.

In examples described above, the spoiler is moved upwards relative to the wing structure such that the upper surface of the spoiler is discontinuous with the upper surface of the wing. In other examples, deploying the spoiler involves pivoting the spoiler about a hinge on the wing upper surface. The spoiler actuation apparatus as described herein may be used to deploy and/or retract such a pivoting spoiler.

In examples described above, the rack is mounted on the guide member via a linear ball bearing. In other examples, other types of mounting are used, such as rails, wheels, linear slides, etc.

In examples described above, the actuator is operable to move the rack from the third position, corresponding to the spoiler being fully deployed, towards the first position, to cause the spoiler to be retracted. In other examples, the actuator is not operable to cause the spoiler to be retracted. For example, a further actuator may be used to retract the spoiler. The further actuator may operate similarly or differently from the actuator used to cause the spoiler to deploy.

In examples described above, a linkage arm couples the gear to the spoiler and rotates relative to the rotational axis of the gear as the spoiler is deployed. Other ways of linking the gear to the spoiler may be used in other examples. For example, the gear may be coupled to the spoiler directly, or may be coupled to the spoiler via one or more other gears, arms, rods, pins, cams, etc.

In examples described above, a restraining assembly prevents rotation of the linkage arm in a given direction when the rack is at the first position. In some examples, the restraining assembly (e.g. a stop) acts on the linkage arm directly. In other examples, the restraining assembly acts on the linkage arm indirectly. For example, the linkage arm may be restrained due to the rack being held against a stop on the guide member.

In examples described above, the linkage arm is displaced relative to the bottom center position when the rack is at the first position. In other examples, the linkage arm is at the bottom center position when the rack is at the first position.

A spoiler actuation apparatus such as the spoiler actuation apparatus 200 described above may be used to drive moveable devices other than spoilers. Such devices may be on aircraft, other vehicles, or may be used in non-vehicle scenarios. For example, an actuator assembly such as that described herein may be used to drive leading edge slats, wing tip devices, or trailing edge flaps on an aircraft wing.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features that are described as preferable, advantageous, convenient or the like are optional and do not limit the scope of the independent claims. Moreover, it is to be understood that such optional integers or features, while of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft wing comprising:
a wing structure;
a spoiler moveable relative to the wing structure between a stowed configuration and a deployed configuration; and
a spoiler actuation apparatus comprising:
a guide member;
a rack mounted on the guide member and slideable along a longitudinal axis of the guide member, wherein the rack is arranged to be held at a first position along the longitudinal axis when the spoiler is in the stowed configuration;
a gear coupled to the rack, the gear being arranged to move the spoiler relative to the wing structure in response to sliding of the rack, movement of the spoiler relative to the wing structure being substantially linear, defined within a plane defined by a height and a width of the spoiler; and
an actuator operable to move the rack from the first position to a second position along the longitudinal axis, wherein, when the rack is at the second position, the rack is operable to accelerate relative to the guide member away from the second position by an aerodynamic force acting on the spoiler, such that the spoiler moves from the stowed configuration to the deployed configuration.

2. The aircraft wing according to claim 1, wherein the rack is mounted on the guide member using a linear ball bearing.

3. The aircraft wing according to claim 1, wherein, when the rack is at the second position, the rack is operable to accelerate away from the second position in the absence of the actuator acting on the rack.

4. The aircraft wing according to claim 1, wherein the actuator comprises the guide member, the rack mounted on the guide member being linearly moveable along the longitudinal axis.

5. The aircraft wing according to claim 1, wherein, when the spoiler is in the deployed configuration, the rack is at a third position along the longitudinal axis, and wherein the actuator is operable to move the rack from the third position towards the first position, to cause the spoiler to move from the deployed configuration to the stowed configuration.

6. The aircraft wing according to claim 1, wherein the spoiler actuation apparatus comprises a linkage arm coupled to the gear and to the spoiler, wherein rotation of the gear causes the linkage arm to rotate about a rotational axis of the gear, thereby moving the spoiler.

7. The aircraft wing according to claim 6, wherein, when the rack is at the first position, the aerodynamic force is operable to urge the linkage arm to rotate in a first direction, and wherein, when the rack is at the second position, the aerodynamic force is operable to urge the linkage arm to rotate in a second, different direction.

8. The aircraft wing according to claim 7, wherein the spoiler actuation apparatus comprises a restraining assembly operable to prevent rotation of the linkage arm in the first direction when the rack is at the first position.

9. The aircraft wing according to claim 8, wherein the restraining assembly is operable to apply a restraining force to the linkage arm, the restraining force acting against the aerodynamic force, thereby to prevent the spoiler from deploying when the rack is in the first position.

10. The aircraft wing according to claim 7, wherein the spoiler actuation apparatus comprises a further restraining assembly operable to prevent rotation of the linkage arm in a second direction when the spoiler is in the deployed configuration.

11. The aircraft wing according to claim 6, wherein the linkage arm is arranged to rotate about the rotational axis of the gear between a bottom center position and a top center position, the linkage arm being arranged to be at the top center position when the spoiler is in the deployed configuration, and wherein the linkage arm is displaced relative to the bottom center position when the rack is at the first position.

12. An aircraft comprising the aircraft wing according to claim 1.

13. A method of actuating a spoiler for an aircraft wing, the wing comprising a wing structure and a spoiler moveable relative to the wing structure between a stowed configuration and a deployed configuration, the method comprising:
holding a rack at a first position along a longitudinal axis of a guide member when the spoiler is in the stowed configuration, the rack being mounted on the guide member and slideable along the longitudinal axis, wherein a gear coupled to the rack is arranged to move the spoiler relative to the wing structure in response to sliding of the rack; and
moving the rack from the first position to a second position along the longitudinal axis, wherein:
movement of the spoiler relative to the wing structure is substantially linear, defined within a plane defined by a height and a width of the spoiler; and
when the rack is at the second position, the rack is operable to accelerate relative to the guide member away from the second position by an aerodynamic force acting on the spoiler, such that the spoiler moves from the stowed configuration to the deployed configuration.

14. An aircraft wing comprising:
a wing structure;
a spoiler moveable relative to the wing structure between a stowed configuration and a deployed configuration, wherein movement of the spoiler relative to the wing structure is substantially linear, defined within a plane defined by a height and a width of the spoiler; and
a spoiler actuation apparatus comprising:
a push-pull rod;
a rack slideably mounted on the push-pull rod and slideable along a longitudinal axis of the push-pull rod by the push-pull rod; and
a gear coupled to the rack, the gear being arranged to move the spoiler relative to the wing structure in response to sliding of the rack,
wherein the rack is operable to slide relative to the push-pull rod under the action of an aerodynamic force to deploy the spoiler.

15. The aircraft wing according to claim 14, wherein:
the rack is mounted on the guide member using a linear ball bearing;
when the rack is at the second position, the rack is operable to accelerate away from the second position in the absence of the actuator acting on the rack;
the actuator comprises the guide member, the guide member being linearly moveable along the longitudinal axis; or
the actuator comprises a first stop rigidly coupled to the guide member, wherein the first stop is operable to push the rack from the first position to the second position.

16. The aircraft wing according to claim 14, wherein:
when the spoiler is in the deployed configuration, the rack is at a third position along the longitudinal axis;
the actuator is operable to move the rack from the third position towards the first position, to cause the spoiler to move from the deployed configuration to the stowed configuration;
the actuator comprises a first stop rigidly coupled to the guide member;
the first stop is operable to push the rack from the first position to the second position; and
the actuator comprises a further stop rigidly coupled to the guide member, the further stop being arranged to push the rack from the third position towards the first position.

17. The aircraft wing according to claim 14, wherein:
the spoiler actuation apparatus comprises a linkage arm coupled to the gear and to the spoiler;
rotation of the gear causes the linkage arm to rotate about a rotational axis of the gear, thereby to move the spoiler;
when the rack is at the first position, the aerodynamic force is operable to urge the linkage arm to rotate in a first direction; and
when the rack is at the second position, the aerodynamic force is operable to urge the linkage arm to rotate in a second, different direction.

18. The aircraft wing according to claim 17, wherein the spoiler actuation apparatus comprises:
a restraining assembly operable to prevent rotation of the linkage arm in the first direction when the rack is at the first position; and/or
a further restraining assembly operable to prevent rotation of the linkage arm in a second direction when the spoiler is in the deployed configuration.

* * * * *